(12) United States Patent
Huang et al.

(10) Patent No.: US 9,349,345 B2
(45) Date of Patent: May 24, 2016

(54) SYSTEMS AND METHODS FOR PERFORMING COLOR ADJUSTMENT OF PIXELS ON A COLOR DISPLAY

(71) Applicant: Marvell World Trade Ltd., St. Michael (BB)

(72) Inventors: Samson Huang, Saratoga, CA (US); Alice Hsia, Los Altos, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 98 days.

(21) Appl. No.: 14/284,939

(22) Filed: May 22, 2014

(65) Prior Publication Data

US 2014/0253578 A1 Sep. 11, 2014

Related U.S. Application Data

(63) Continuation of application No. 13/353,373, filed on Jan. 19, 2012, now Pat. No. 8,767,002.

(60) Provisional application No. 61/437,943, filed on Jan. 31, 2011.

(51) Int. Cl.
| | |
|---|---|
| *G06T 11/00* | (2006.01) |
| *G06T 5/00* | (2006.01) |
| *G09G 5/02* | (2006.01) |
| *H04N 9/68* | (2006.01) |
| *H04N 9/64* | (2006.01) |
| *H04N 1/60* | (2006.01) |
| *H04N 5/58* | (2006.01) |
| *G09G 3/34* | (2006.01) |

(52) U.S. Cl.
CPC ............... *G09G 5/02* (2013.01); *G06T 11/001* (2013.01); *H04N 9/68* (2013.01); *G09G 3/344* (2013.01); *G09G 2320/0242* (2013.01); *G09G 2320/0666* (2013.01); *G09G 2340/06* (2013.01)

(58) Field of Classification Search
CPC combination set(s) only.
See application file for complete search history.

(56) References Cited

U.S. PATENT DOCUMENTS

| | | | |
|---|---|---|---|
| 5,315,694 A | 5/1994 | Kasano | |
| 6,757,428 B1 * | 6/2004 | Lin | ...................... G06K 9/3241 |
| | | | 382/162 |

(Continued)

FOREIGN PATENT DOCUMENTS

| | | |
|---|---|---|
| CN | 1477598 | 2/2004 |
| CN | 101198070 | 6/2008 |

(Continued)

OTHER PUBLICATIONS

International Preliminary Report on Patentability and Written Opinion dated Aug. 6, 2013 from related/corresponding International PCT Patent Appl. No. PCT/US2012/021796 filed Jan. 19, 2012.

(Continued)

*Primary Examiner* — Wesner Sajous

(57) ABSTRACT

System and methods are provided for performing saturation adjustment of one or more pixels. In one embodiment, an input color value of a pixel is received. The input color value includes an input saturation component. An adjusted color value is extracted from a predetermined look-up table that maps the input color value to the adjusted color value, the adjusted color value having an adjusted saturation component that is different from the input saturation component. The adjusted color value is output.

17 Claims, 3 Drawing Sheets

(56) References Cited

U.S. PATENT DOCUMENTS

| | | | | |
|---|---|---|---|---|
| 8,767,002 | B2* | 7/2014 | Huang | G09G 5/02 345/589 |
| 2002/0060796 | A1* | 5/2002 | Kanno | H04N 1/6075 358/1.9 |
| 2002/0102018 | A1* | 8/2002 | Lin | G06K 9/3241 382/165 |
| 2008/0018939 | A1 | 1/2008 | Yamada et al. | |
| 2008/0317338 | A1* | 12/2008 | Shirai | H04N 1/62 382/167 |
| 2011/0285714 | A1 | 11/2011 | Swic | |
| 2011/0285746 | A1 | 11/2011 | Swic | |
| 2011/0292071 | A1* | 12/2011 | Kwon | G09G 3/3233 345/603 |
| 2012/0113441 | A1* | 5/2012 | Hama | H04N 1/6058 358/1.9 |
| 2013/0093783 | A1 | 4/2013 | Sullivan et al. | |

FOREIGN PATENT DOCUMENTS

| | | |
|---|---|---|
| CN | 101251985 | 8/2008 |
| CN | 101261809 | 9/2008 |
| CN | 101715141 | 9/2008 |
| CN | 101505432 | 8/2009 |
| CN | 101543084 | 9/2009 |
| EP | 1383341 | 1/2004 |
| EP | 1914980 | 4/2008 |
| WO | 2008065575 | 6/2008 |

OTHER PUBLICATIONS

International Search Report and Written Opinion from the European Patent Office for PCT/US2012/021796, mailed on Apr. 11, 2012.
2nd Office Action mailed Jun. 11, 2015 in related/corresponding Chinese Patent Appl. No. 201280007088.9 filed Jul. 30, 2013.
1st Office Action issued Dec. 23, 2014 in related/corresponding Chinese Patent Appl. No. 201280007088.9 filed Jul. 30, 2013.
Third Office Action dated Nov. 13, 2015 in related/corresponding Chinese Patent Appl. No. 201280007088.9 filed Jul. 30, 2013.

* cited by examiner

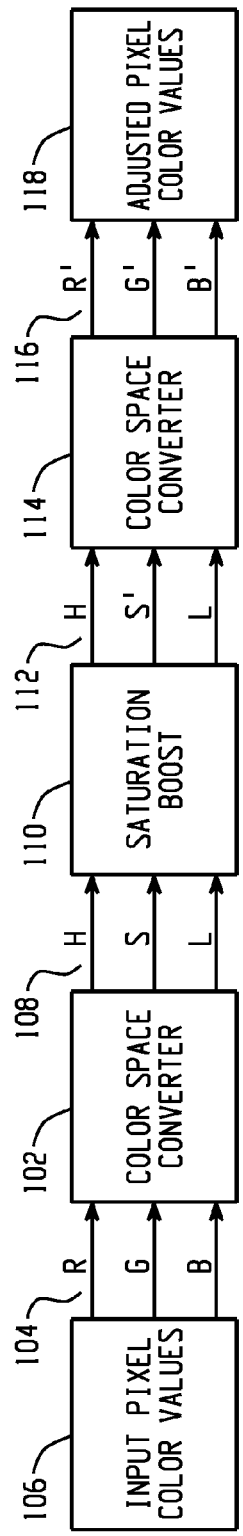
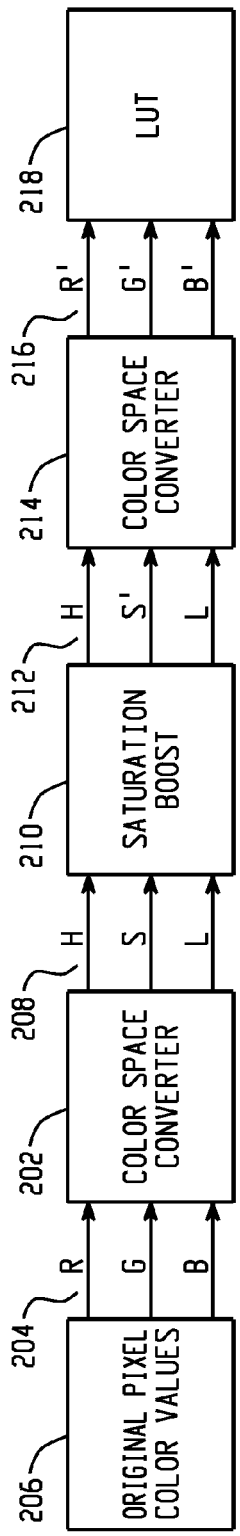
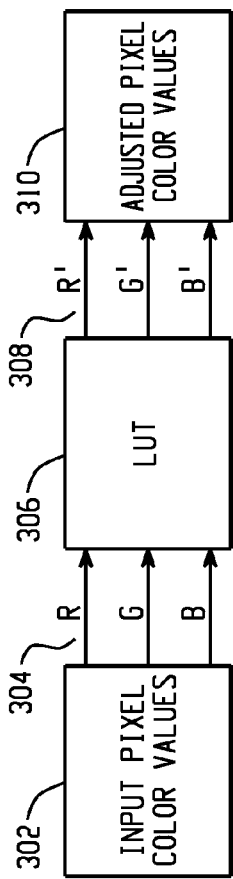
Fig. 1
Fig. 2
Fig. 3

SYSTEMS AND METHODS FOR PERFORMING COLOR ADJUSTMENT OF PIXELS ON A COLOR DISPLAY

CROSS-REFERENCE TO RELATED APPLICATIONS

This application is a continuation of U.S. patent application Ser. No. 13/353,373, filed on Jan. 19, 2012, which claims priority to and benefit from U.S. Provisional Patent Application No. 61/437,943, filed on Jan. 31, 2011, and entitled "Methods to Enhance EPD Color Display For Real Time Implementation," the entirety of which is incorporated herein by reference.

FIELD

The technology described in this patent document relates generally to image processing.

BACKGROUND

Various display technologies have been developed for different applications. For example, electrophoretic displays (EPDs) are designed for electronic paper applications to mimic an appearance of ordinary ink on paper. An EPD generally includes a plurality of charged particles dispersed in an electrophoretic layer. The charged particles migrate under influence of an electric field to reflect ambient light for displaying images.

Conventionally, EPD panels are monochrome, typically with 16 levels of grayscale. Lately, color EPD panels have been developed by adding color filter array (CFA) over the monochrome EPD panels. These color EPD panels have certain disadvantages in brightness and color saturation, because the CFA passes through only a fraction of visible light and attenuates both incident light and reflected light significantly. Therefore, it is highly desirable to boost the color saturation for EPD color panels.

Because input image data for an EPD color panel are often represented in a red-green-blue (RGB) color space, a conventional approach to enhance color EPD's brightness and color saturation is to boost the RGB values of pixels on an EPD color panel by a certain amount. However, this approach often causes color shifting and results in loss of color fidelity.

There is another conventional approach to enhance brightness and color saturation of EPD color panels. Input image data can be converted from the RGB color space to a hue-saturation-lightness (HSL) color space, the saturation values of the HSL image data may be adjusted, and then the adjusted HSL image data may be converted back to the RGB color space. FIG. 1 illustrates a conventional system 100 for performing saturation adjustment of input color values. A color space converter 102 converts an RGB representation 104 of an input pixel color value 106 into an HSL representation 108 that includes a hue value, a saturation value and a lightness value. A saturation-adjustment component 110 adjusts the saturation value of the HSL representation 108, and outputs a new HSL representation 112. A color space converter 114 converts the new HSL representation 112 into a new RGB representation 116 which is output for providing an adjusted pixel color value 118.

SUMMARY

In accordance with the teachings described herein, systems and methods are provided for performing saturation adjustment of one or more pixels. In one embodiment, an input RGB color value of a pixel is received, the input color value including an input saturation. An adjusted color value from a predetermined look-up table that maps the input color value to the adjusted color value is extracted using a data processor, the adjusted color value having an adjusted saturation that is different from the input saturation. Additionally, the adjusted color value is output in RGB.

In another embodiment, a processor-implemented method is provided for performing saturation adjustment of one or more pixels. An input RGB color value of a pixel is received, the input color value including an input saturation. An adjusted color value based on a predetermined saturation-adjustment matrix is generated using a data processor, the adjusted color value having an adjusted saturation that is different from the input saturation. Moreover, the adjusted color value is output in RGB.

In yet another embodiment, a processor-implemented system for performing saturation adjustment of one or more pixels includes one or more data processors and a computer-readable storage medium. The computer-readable storage medium is encoded with instructions for commanding the one or more data processors to execute steps including: receiving an input RGB color value of a pixel, the input color value including an input saturation, extracting, using a data processor, an adjusted color value from a predetermined look-up table that maps the input color value to the adjusted color value, the adjusted color value having an adjusted saturation that is different from the input saturation, and outputting the adjusted RGB color value.

According to another embodiment, a processor-implemented system for performing saturation adjustment of one or more pixels includes one or more data processors and a computer-readable storage medium. The computer-readable storage medium is encoded with instructions for commanding the one or more data processors to execute steps including: receiving an input RGB color value of a pixel, the input color value including an input saturation, generating, using a data processor, an adjusted color value based on a predetermined saturation-adjustment matrix, the adjusted color value having an adjusted saturation that is different from the input saturation, and outputting the adjusted RGB color value.

BRIEF DESCRIPTION OF THE DRAWINGS

FIG. 1 illustrates a conventional system for performing saturation adjustment of input color values.

FIG. 2 depicts an example system for generating a look-up table for saturation adjustment.

FIG. 3 depicts an example system for performing saturation adjustment using a predetermined look-up table.

DETAILED DESCRIPTION

Figures 4, 5:
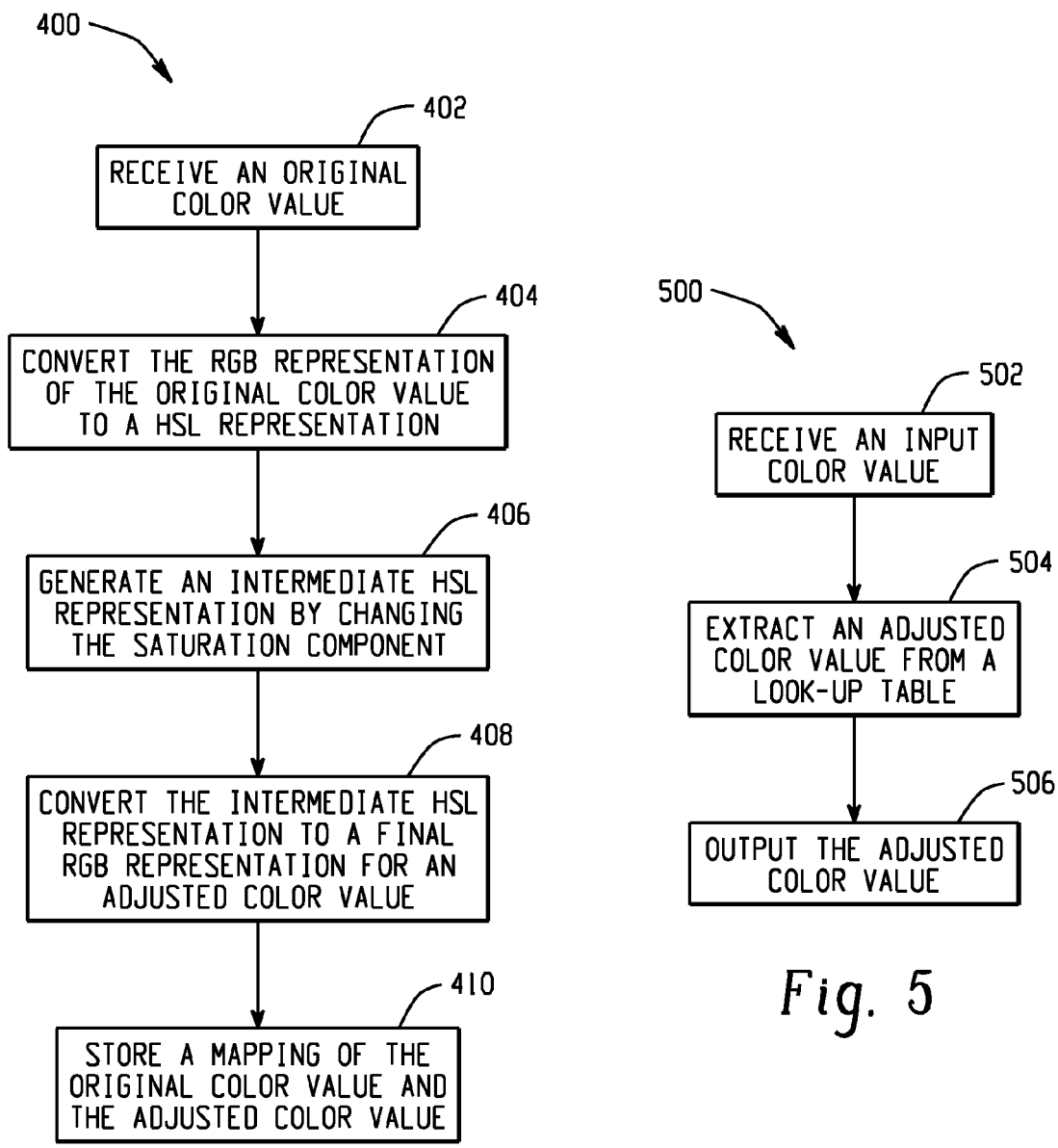
FIG. 4 illustrates an example flow diagram depicting a method for generating a look-up table for saturation adjustment.
FIG. 5 illustrates an example flow diagram depicting a method for performing saturation adjustment using a predetermined look-up table.

Referring to FIG. 1, if the system 100 is used for real-time processing of each pixel of an EPD display, a large amount of computation is often necessary, including floating point computations, which results in a high demand of resources and a low refresh rate. FIGS. 2 and 3 illustrate an example of a more efficient way for performing saturation adjustment using a predetermined look-up table.

FIG. 2 depicts an example system 200 for generating a look-up table for saturation adjustment. As shown in FIG. 2, a color space converter 202 converts an RGB representation 204 of an original pixel color value 206 into an HSL representation 208. A saturation-adjustment component 210 adjusts the saturation value of the HSL representation 208, and outputs a new HSL representation 212. For example, the saturation value of the HSL representation 208 may be adjusted by a saturation factor of P, where P is larger than 1. A color space converter 214 converts the new HSL representation 212 into a new RGB representation 216 which indicates an adjusted color value. A mapping between the original color value 206 and the adjusted color value is stored in a look-up table 218.

Original pixel color values of each pixel of an EPD display may be processed similarly as discussed above, and mappings between the adjusted color values and the original pixel color values may be stored in the look-up table. During subsequent real-time processing of input image data, the predetermined look-up table may be loaded into a memory and adjusted color values corresponding to input color values can be extracted from the look-up table by searching for original color values that match the input color values, saving a significant amount of computation time.

FIG. 3 depicts an example system 300 for performing saturation adjustment using a predetermined look-up table. In one embodiment, the predetermined look-up table 306 may be generated in a way similar to what is shown in FIG. 2. Once generated, the same look-up table 306 may be used for subsequent processing of different input image data.

In operation, an input pixel color value 302 is received. The look-up table 306 is searched based on a RGB representation 304 of the input pixel color value 302. If an original color value in the look-up table 306 is found to match the input pixel color value 302, an adjusted color value 310 that is mapped to the original color value in the look-up table 306 is output with an RGB representation 308.

FIG. 4 illustrates an example flow diagram depicting a method for generating a look-up table for saturation adjustment. At 402, an original color value is received, where the original color value is represented in the RGB color space. The original color value is converted from the RGB color space to the HSL color space to generate an HSL representation for the original color value at 404. The saturation component of the HSL representation is changed, and an intermediate HSL representation is generated at 406. At 408, the intermediate HSL representation is converted back to the RGB color space to generate a final RGB representation which depicts an adjusted color value. A mapping of the original color value and the adjusted color value is stored in a look-up table at 410. All original color values of pixels on a color display may be processed similarly to generate adjusted color values to populate the look-up table for subsequent processing of input image data.

FIG. 5 illustrates an example flow diagram depicting a method for performing saturation adjustment using a predetermined look-up table. At 502, an input color value of a pixel is received. For example, the input color value of the pixel is represented in the RGB color space. A predetermined look-up table is searched for an original color value that matches the input color value, and an adjusted color value that corresponds to the original color value in the look-up table is extracted at 504. The adjusted color value is output at 506. Compared with the input color value, the adjusted color value indicates a different color saturation. For example, if both the adjusted color value and the input color value are represented in the HSL color space, then the adjusted color value will have a higher saturation value than the input color value.

Figure 6:
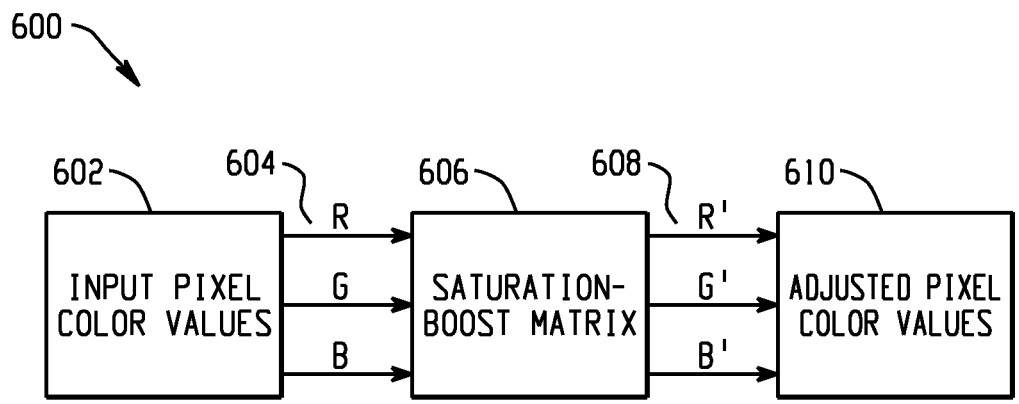
FIG. 6 illustrates an example scheme for performing saturation adjustment using a predetermined saturation-adjustment matrix.

Alternatively, saturation adjustment of input image data may be performed using a saturation-adjustment matrix. This may eliminate a need for computation related to conversions between the RGB color space and the HSL color space. FIG. 6 illustrates an example scheme for performing saturation adjustment using a predetermined saturation-adjustment matrix.

An input color value 602 is received. Saturation adjustment of the input color value 602 is performed by multiplying an RGB representation 604 of the input pixel color value 602 by the predetermined saturation-adjustment matrix 606. A new RGB representation 608 is thus generated, and an adjusted color value 610 is output.

The saturation-adjustment matrix may be determined in various different ways. For example, the saturation-adjustment matrix 606 may be a 3×3 matrix, such as $$\begin{bmatrix} C_{00} & C_{01} & C_{02} \\ C_{10} & C_{11} & C_{12} \\ C_{20} & C_{21} & C_{22} \end{bmatrix}.$$

The coefficients of the 3×3 saturation-adjustment matrix 606 may be determined based on a saturation factor, SF, according to the following equations.

$C_{00}=0.25\times(1-SF)+0.5\times SF; C_{01}=0.50\times(1-SF);$
$C_{02}=0.25\times(1-SF);$ $C_{10}=0.25\times(1-SF); C_{11}=0.50\times(1-SF)+0.5\times SF;$
$C_{12}=0.25\times(1-SF);$ $C_{20}=0.25\times(1-SF); C_{21}=0.50\times(1-SF);$
$C_{22}=0.25\times(1-SF)+0.5\times SF.$ For example, the value of the saturation factor, SF, may be between 1 and 2. The coefficients of the saturation-adjustment matrix 606 may be generated in fixed-point numbers to reduce computation time.

Figure 7:
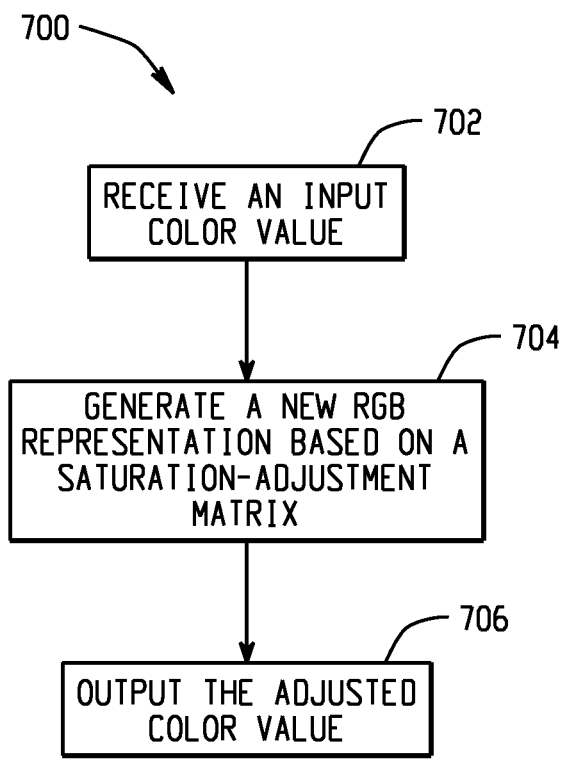
FIG. 7 illustrates an example flow diagram depicting a method for performing saturation adjustment using a predetermined saturation-adjustment matrix.

FIG. 7 illustrates an example flow diagram depicting a method for performing saturation adjustment using a predetermined saturation-adjustment matrix. At 702, an input color value of a pixel is received. In this example, the input color value of the pixel is represented in the RGB color space. The RGB representation of the input color value is multiplied by a predetermined saturation-adjustment matrix to generate a new RGB representation at 704. The new RGB representation corresponds to an adjusted color value. The adjusted color value is output at 706.

This written description uses examples to disclose the invention, include the best mode, and also to enable a person skilled in the art to make and use the invention. The patentable scope of the invention may include other examples that occur to those skilled in the art. For example, systems and methods disclosed herein may be applied for different color displays, such as liquid crystal displays, light emitting diode displays, electroluminescent displays, plasma display panels, organic light emitting diode displays, surface-conduction electron-emitter displays, and nanocrystal displays. As an example, systems and methods can be configured as disclosed herein to enhance color saturation with much lower computational demand.

It is claimed:

1. A processor-implemented method for adjusting saturation in a hue-saturation-lightness (HSL) color space, the method comprising:
    receiving an original color value represented in a non-HSL color space;
    generating, from the original color value in the non-HSL color space, a HSL representation that includes a saturation component;
    adjusting the saturation component of the HSL representation, to yield a saturation-adjusted HSL representation;
    generating, from the saturation-adjusted HSL representation, a non-HSL representation in the non-HSL color space, wherein the non-HSL representation comprise a saturation-adjusted color value;
    storing, in a lookup table of a memory in a computing device, a correspondence between the original color value and the saturation-adjusted color value, wherein the original color value is a first original color and is one of multiple original color values stored in the lookup table;
    receiving a second original color value; and
    searching the lookup table for the second original color value.

2. The method of claim 1, wherein the non-HSL color space is red-green-blue (RGB) color space.

3. The method of claim 1, further comprising:
    determining that the second original color value matches the first original color value stored in the lookup table; and
    in response to determining that the second original color value matches the first original color value, outputting the saturation-adjusted color value.

4. The method of claim 1, wherein the adjusting of the saturation component enhances the saturation component.

5. The method of claim 1, wherein the receiving, the generating of the HSL representation, the adjusting, the generating of the non-HSL representation, and the storing are performed for an original color value of each of multiple pixels in a color display to populate the lookup table.

6. The method of claim 5, wherein the receiving, the generating of the HSL representation, the adjusting, the generating of the non-HSL representation, and the storing are performed for an original color value of each pixel in the color display to populate the lookup table.

7. The method of claim 5, wherein the display is an electrophoretic display.

8. A system configured to adjust saturation in hue-saturation-lightness (HSL) color space, the system comprising:
    an input configured to receive an original color value represented in a non-HSL color space;
    a first color space converter configured to generate, from the original color value in the non-HSL color space, a HSL representation that includes a saturation component;
    a first saturation adjuster configured to adjust the saturation component of the HSL representation, to yield a saturation-adjusted HSL representation;
    a second color space converter configured to generate, from the saturation-adjusted HSL representation, a non-HSL representation in the non-HSL color space, wherein the non-HSL representation comprises a saturation-adjusted color value; and
    a lookup table in a memory, configured to store a correspondence between the original color value and the saturation-adjusted color value, wherein the original color value is a first original color value and is one of multiple original color values stored in the lookup table;
    wherein the input is further configured to receive a second original color value, and the system further includes a processor configured to search the lookup table for the second original color value.

9. The system of claim 8, wherein the non-HSL color space is red-green-blue (RGB) color space.

10. the system of claim 9, wherein the processor is further configured to:
    determine that the second original color value matches the first original color value stored in the lookup table; and
    in response to determining that the second original color value matches the first original color value, output the saturation-adjusted color value.

11. The system of claim 8, wherein the adjusting of the saturation component enhances the saturation component.

12. The system of claim 8, wherein the receiving, the generating of the HSL representation, the adjusting, the generating of the non-HSL representation, and the storing are performed for an original color value of each of multiple pixels in a color display to populate the lookup table.

13. A non-transitory processor readable storage medium encoded with instructions that are configured to be executed by a processor to adjust saturation in hue-saturation-lightness (HSL) color space by:
    receiving an original color value represented in a non-HSL color space;
    generating, from the original color value in the non-HSL color space, a HSL representation that includes a saturation component
    adjusting the saturation component of the HSL representation, to yield a saturation adjusted HSL representation;
    generating, from the saturation-adjusted HSL, representation, a non HSL representation in the non-HSL color space, wherein the non-HSL representation comprises a saturation-adjusted color value;
    storing, in a lookup table, a correspondence between the original color value and the saturation-adjusted color value, wherein the original color value is a first original color value and is one of multiple original color values stored in the lookup table;
    receiving a second original color value: and
    searching the lookup table for the second original color value.

14. The processor readable storage medium of claim 13, wherein the non-HSL color space is red-green-blue (RGB) color space.

15. The non-transitory processor readable storage medium of claim 13, wherein the instructions are further configured to:
    determine that the second original color value matches the stored first original color value in the lookup table; and
    in response to determining that the second original color value matches the first original color value, output the saturation-color adjusted color value.

16. The non-transitory processor readable storage medium of claim 13, wherein the adjusting of the saturation component enhances the saturation component.

17. The non-transitory processor readable storage medium of claim 13, wherein the receiving, the generating of the HSL representation, the adjusting, the generating of the non-HSL representation, and the storing are performed for an original color value of each of multiple pixels in a color display to populate the lookup table.

* * * * *